US011886903B2

(12) United States Patent
Granado

(10) Patent No.: US 11,886,903 B2
(45) Date of Patent: *Jan. 30, 2024

(54) CONTINUOUS UPTIME OF GUEST VIRTUAL MACHINES DURING UPGRADE OF A VIRTUALIZATION HOST DEVICE

(71) Applicant: Citrix Systems, Inc., Fort Lauderdale, FL (US)

(72) Inventor: Marcus Granado, Cambridge (GB)

(*) Notice: Subject to any disclaimer, the term of this patent is extended or adjusted under 35 U.S.C. 154(b) by 387 days.

This patent is subject to a terminal disclaimer.

(21) Appl. No.: 17/075,249

(22) Filed: Oct. 20, 2020

(65) Prior Publication Data

US 2021/0117221 A1 Apr. 22, 2021

Related U.S. Application Data

(63) Continuation of application No. 15/405,461, filed on Jan. 13, 2017, now Pat. No. 10,866,824.

(51) Int. Cl.
G06F 9/455 (2018.01)
G06F 8/656 (2018.01)

(52) U.S. Cl.
CPC .......... G06F 9/45558 (2013.01); G06F 8/656 (2018.02); G06F 2009/4557 (2013.01); G06F 2009/45575 (2013.01); G06F 2009/45579 (2013.01)

(58) Field of Classification Search
CPC .................. G06F 9/45558; G06F 8/656; G06F 2009/4557; G06F 2009/45579; G06F 2009/45575
See application file for complete search history.

(56) References Cited

U.S. PATENT DOCUMENTS

| 7,865,893 | B1 | 1/2011 | Omelyanchuk et al. |
| 8,316,374 | B2 | 11/2012 | Lim et al. |
| 8,713,139 | B1* | 4/2014 | Kasper ................ G06F 9/44505 709/221 |
| 9,021,459 | B1* | 4/2015 | Qu ....................... G06F 11/1484 710/33 |
| 9,841,988 | B1 | 12/2017 | Magnezi et al. |
| 9,906,459 | B2* | 2/2018 | Smith .................. H04L 67/148 |
| 2006/0005189 | A1 | 1/2006 | Vega et al. |
| 2012/0047501 | A1 | 2/2012 | Box et al. |
| 2013/0254404 | A1 | 9/2013 | Johnsen et al. |

(Continued)

OTHER PUBLICATIONS

Kadav et al., "Live Migration of Direct-Access Devices", WIOV'08, Dec. 2008.

(Continued)

Primary Examiner — Lewis A Bullock, Jr.
Assistant Examiner — Kevin X Lu

(57) ABSTRACT

Systems and methods for providing a continuous uptime of guest Virtual Machines ("VMs") during upgrade of a virtualization host device. The methods comprising: connecting all of the guest VMs' frontends or drivers to at least one old control VM which is currently running on the virtualization host device and which contains old virtualization software; creating at least one upgraded control VM that contains new virtualization software and that is to replace the old VM in the virtualization host device; connecting the guest VMs' frontends or drivers to the upgraded VM; and uninstalling the old control VM from the virtualization host device.

17 Claims, 5 Drawing Sheets

(56) References Cited

U.S. PATENT DOCUMENTS

| | | | |
|---|---|---|---|
| 2014/0149635 A1* | 5/2014 | Bacher | G06F 9/467 718/1 |
| 2015/0033220 A1* | 1/2015 | Venkat | G06F 9/45541 718/1 |
| 2016/0283334 A1 | 9/2016 | Gupta et al. | |
| 2016/0306648 A1* | 10/2016 | Deguillard | G06F 3/0664 |
| 2017/0034198 A1 | 2/2017 | Powers et al. | |
| 2017/0054557 A1 | 2/2017 | Rozas et al. | |
| 2017/0371691 A1* | 12/2017 | Gunti | G06F 12/109 |
| 2018/0004954 A1 | 1/2018 | Liguori et al. | |
| 2018/0183750 A1* | 6/2018 | Wang | H04L 61/103 |

* cited by examiner

CONTINUOUS UPTIME OF GUEST VIRTUAL MACHINES DURING UPGRADE OF A VIRTUALIZATION HOST DEVICE

CROSS REFERENCE TO RELATED APPLICATIONS

This application is a continuation of U.S. patent application Ser. No. 15/405,461, filed Jan. 13, 2017, now U.S. Pat. No. 10,866,824, the content of which is incorporated by reference in its entirety.

BACKGROUND

Statement of the Technical Field

The present document relates to computer systems. More particularly, the present document relates to systems and methods for providing a continuous uptime of guest Virtual Machines ("VMs") during upgrade of a virtualization host device.

DESCRIPTION OF THE RELATED ART

A software upgrade of a virtualization host device requires the loading of upgraded virtualization software into the host device's working memory, whereby a new version of the virtualization software replaces an old version of the virtualization software. The usual way of performing this loading task is to reboot the host device so that the upgraded virtualization software can be transferred from the host device's persistent memory to the host device's working memory.

This presents a problem for software upgrades of the virtualization host device. For example, during the reboot, both the host device and its associated guest VMs are not running. Therefore, the host device and the guest VMs cannot act or react to the outside environment. This is not desirable in many applications. Accordingly, various solutions have been derived to address this problem.

One such solution is to live migrate the guest VMs to at least one extra or spare host device. The live migration results in the continued running of the guest VMs without interruption. However, this solution suffers from many drawbacks. For example, this solution requires both extra host devices (increasing the Total Cost of Ownership ("TCO") of the solution) and the presence of live migration drivers in the guest VMs.

Another solution uses Kernel patching techniques (such as the Linux Kernel live-patching) to upgrade the virtualization software. This solution is limited in scope of what it can change in the virtualization software. This solution is useful when there's a small change in some kernel function (usually to fix security bugs), but becomes tricky to develop when there are changes in data structures (because they can potentially have a knock-on effect on many other functions). This solution also does not handle upgrades in the user space tools.

SUMMARY

The present document concerns implementing systems and methods for providing a continuous uptime of guest VMs during upgrade of a virtualization host device. The methods comprise: connecting the guest VMs' drivers to at least one old control VM which is currently running on the virtualization host device and which contains old virtualization software; creating at least one upgraded control VM that contains new virtualization software and that is to replace the old control VM in the virtualization host device; connecting the guest VMs' drivers to the upgraded control VM; and uninstalling the old control VM from the virtualization host device.

The upgraded control VM takes communications with the guest VMs from the old control VM without the guest VMs experiencing any operational interruptions. In some scenarios, virtual migration drivers are installed in the guest VMs so as to provide live-migration capabilities thereto. The live-migration capabilities of the guest VMs are used by the upgraded control VM to take communications with the guest VMs from the old control VM.

In those or other scenarios, the new virtualization software: starts new paused virtual I/O backends in the upgraded control VM for each virtual I/O device present in the old virtualization software of the first VM; and eventually sends a notification to the old virtualization software. The notification requests that the old virtualization software perform the following sequence of operations: (a) pause the virtual I/O backend processes of the old control VM; (b) flush any outgoing I/O data to physical devices under the control of the old virtualization software; and (c) relinquish control of the physical devices.

Thereafter, the new virtualization software: acquires the role of a most privileged domain to acquire control of the respective physical devices to which the outgoing I/O data was flushed. After notifying the old virtualization software, the updated virtualization software un-pauses the new paused virtual I/O backends so that the guest VMs I/O activity is resumed. In scenarios using live-migration capabilities, the new virtualization software in the upgraded control VM acts as a temporary I/O bridge to the old virtualization software in the old control VM so that the guest VMs have working live-migration backends in both the old and upgraded control VMs pointing to the same virtual I/O devices during the live migration.

BRIEF DESCRIPTION OF THE DRAWINGS

Embodiments will be described with reference to the following drawing figures, in which like numerals represent like items throughout the figures.

DETAILED DESCRIPTION

Figure 1:
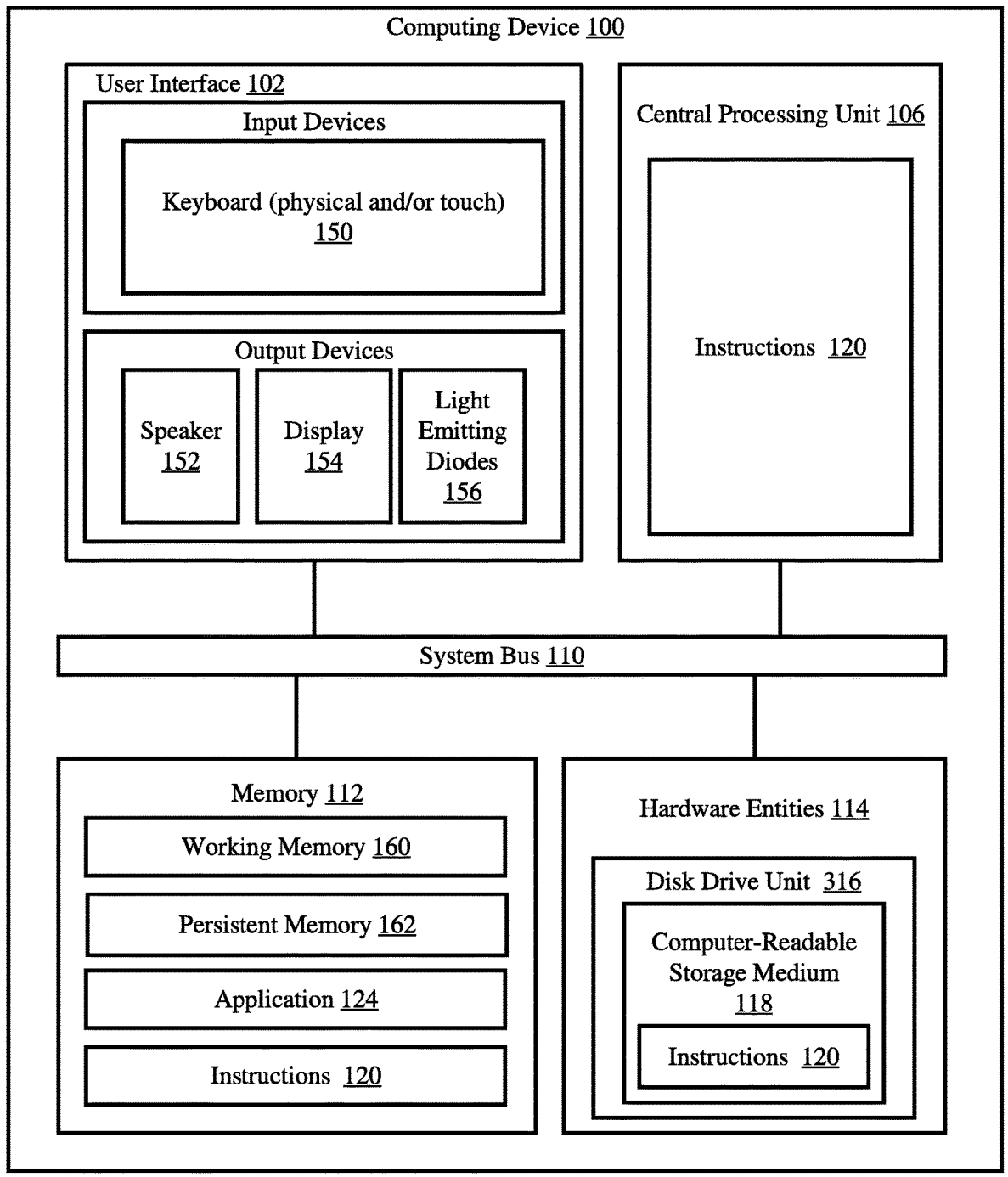
FIG. 1 is an illustration of an exemplary computing device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The term "laptop", as used herein, refers to a system with a physical keyboard permanently attached that allows a user to always type comfortably. The term "tablet", as used herein, refers to a system with no physical keyboard available. The term "convertible", as used herein, refers to a system that the user can transform both in a laptop form factor and a tablet form factor by removing, flipping or swiveling the keyboard.

The present disclosure concerns systems and methods for providing a continuous uptime of guest VMs during upgrade of virtualization host. Unlike conventional solutions (such as those described above in the background section of this paper), the present solution does not require the use of spare or extra host devices to accomplish its goals. In this regard, it should be understood that the present solution solves the above-described problem with software updates in a novel way. In this regard, the present solution uses a mechanism that (a) prevents the rebooting of the host device and the guest VMs and (b) prevents the consequent downtime of the host device and guest VMs. In comparison to the conventional solutions described above in the background section of this paper, the present solution has (a) no need for extra or spare hosts and (b) no requirement for live migration drivers to be present in the guest VMs. Additionally, the present solution is absent of a need to handle live-patching kernel techniques that are (a) limited in scope (few simple functions of the kernel only) and (b) very complex to apply.

The present solution uses the clean architectural domain separation between control domains (or control VMs) and guest domains (or guest VMs) provided by a Virtual Machine Monitor ("VMM") (or hypervisor). The phrases "control domain" and "control VM", as used herein, refer to control or monitor parts of a hypervisor that (a) is configured to control a logical domain environment, (b) is used to configure machine resources and guest domains, and (c) provides services necessary for domain operation. The phrases "guest domain" and "guest VM", as used herein, refer to an Operating System ("OS") instance run by a hypervisor. The present solution can work in any virtualization architecture where it is possible to separate, as individual entities, control domains from guest domains. The main characteristics of the present solution are:

- the creation of new updated control domains, which contain and use updated virtualization software without interrupting operations of guest domains running on the same host device;
- the handing off of the control of the guest domains from the old control domains to the new updated control domains with minimal interruption of the guest domains (e.g., without interrupting the guest domains longer than it would have taken by the conventional solutions which use live migration of the guest domains to another spare host); and
- the absence of a need to use any extra spare hosts. (Note: All the mechanisms of the present solution occur in the same host device, therefore it's possible to save hardware and decrease TCO by not having to buy spare host devices to receive all the guest domains from a host device that is being upgraded.)

The provision of control domains (i.e., most of the virtualization software) can be upgraded in accordance with the above-described characteristics of the present solution.

In some scenarios, a Xen VM Monitor ("VMM") (using a microkernel design) runs on the host device. The Xen VMM is well known in the art, and therefore will not be described herein. However, it should be understood that the Xen VMM is a hypervisor providing services that allow multiple computer OSs to execute on the same computer hardware concurrently. The responsibilities of the Xen VMM include: memory management; Central Processing Unit ("CPU") scheduling of all VMs ("domains"); and the launching of a most privileged domain or master control domain ("Dom0"). Dom0 is a domain from which all unprivileged domains can be launched. The Xen VMM cannot and is not upgraded in the present solution, apart from the limited-scope Xen Live Patching patches applied thereto to fix potential security issues. If the Xen VMM needs to be fully upgraded as well, then a full host device reboot needs to occur and the present solution does not apply. The Xen VMM features are much more stable and change much more slowly than the features of the control domain VMs, so there is an expectation that it's rare that an Xen VMM will need to be fully upgraded (i.e., no Xen microkernel patching or only security patches delivered via the Xen Live Patching feature will suffice, and in all these cases the present solution applies).

The present solution employs either (1) a Xen hypervisor microkernel capable of electing a new master control domain Dom0' or (2) a Xen Live Patch to add this function at the time of the upgrade. The Xen Live Patch is well known in the art, and therefore will not be described herein.

The discussion herein of Xen based systems is provided as a non-limiting exemplary implementation of the present solution. The present solution is not limited to Xen based system scenarios or applications.

Referring now to FIG. 1, there is provided an illustration of an exemplary computing device 100. Computing device 100 may include more or less components than those shown in FIG. 1. However, the components shown are sufficient to disclose an illustrative embodiment implementing the present solution. The hardware architecture of FIG. 1 represents one embodiment of a representative computing device configured to provide a continuous uptime of guest VMs during upgrade of a virtualization host device. As such, the computing device 100 of FIG. 1 implements at least a portion of each method described herein.

Some or all components of the computing device 100 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 1, the computing device 100 comprises a user interface 102, a CPU 106, a system bus 110, a memory 112 connected to and accessible by other portions of computing device 100 through system bus 110, and hardware entities 114 connected to system bus 110. The user interface can include input devices and output devices, which facilitate user-software interactions for controlling operations of the computing device 100. The input devices include, but are not limited, a physical and/or touch keyboard 150. The output devices include, but are not limited to, a speaker 152, a display 154, and/or light emitting diodes 156.

At least some of the hardware entities 114 perform actions involving access to and use of memory 112, which can be a Random Access Memory ("RAM"), a disk driver and/or a Compact Disc Read Only Memory ("CD-ROM"). Memory 112 can include working memory 160 and persistent memory 162, as shown in FIG. 1.

Hardware entities 114 can include a disk drive unit 116 comprising a computer-readable storage medium 118 on which is stored one or more sets of instructions 120 (e.g., software code) configured to implement one or more of the methodologies, procedures, or functions described herein. The instructions 120 can also reside, completely or at least partially, within the memory 112 and/or within the CPU 106 during execution thereof by the computing device 100. The memory 112 and the CPU 106 also can constitute machine-readable media. The term "machine-readable media", as used here, refers to a single medium or multiple media (e.g., a centralized or distributed database, and/or associated caches and servers) that store the one or more sets of instructions 120. The term "machine-readable media", as used here, also refers to any medium that is capable of storing, encoding or carrying a set of instructions 120 for execution by the computing device 100 and that cause the computing device 100 to perform any one or more of the methodologies of the present disclosure.

In some scenarios, the hardware entities 114 include an electronic circuit (e.g., a processor) programmed for facilitating the provision of a continuous uptime of guest VMs during upgrade of a virtualization host device. In this regard, it should be understood that the electronic circuit can access and run software applications 124 installed on the computing device 100. One software application 124 is generally operative to facilitate the provision of a continuous uptime of guest VMs during upgrade of the virtualization host computing device 100. The functions of the software application 124 will become apparent as the discussion progresses.

Figure 2:
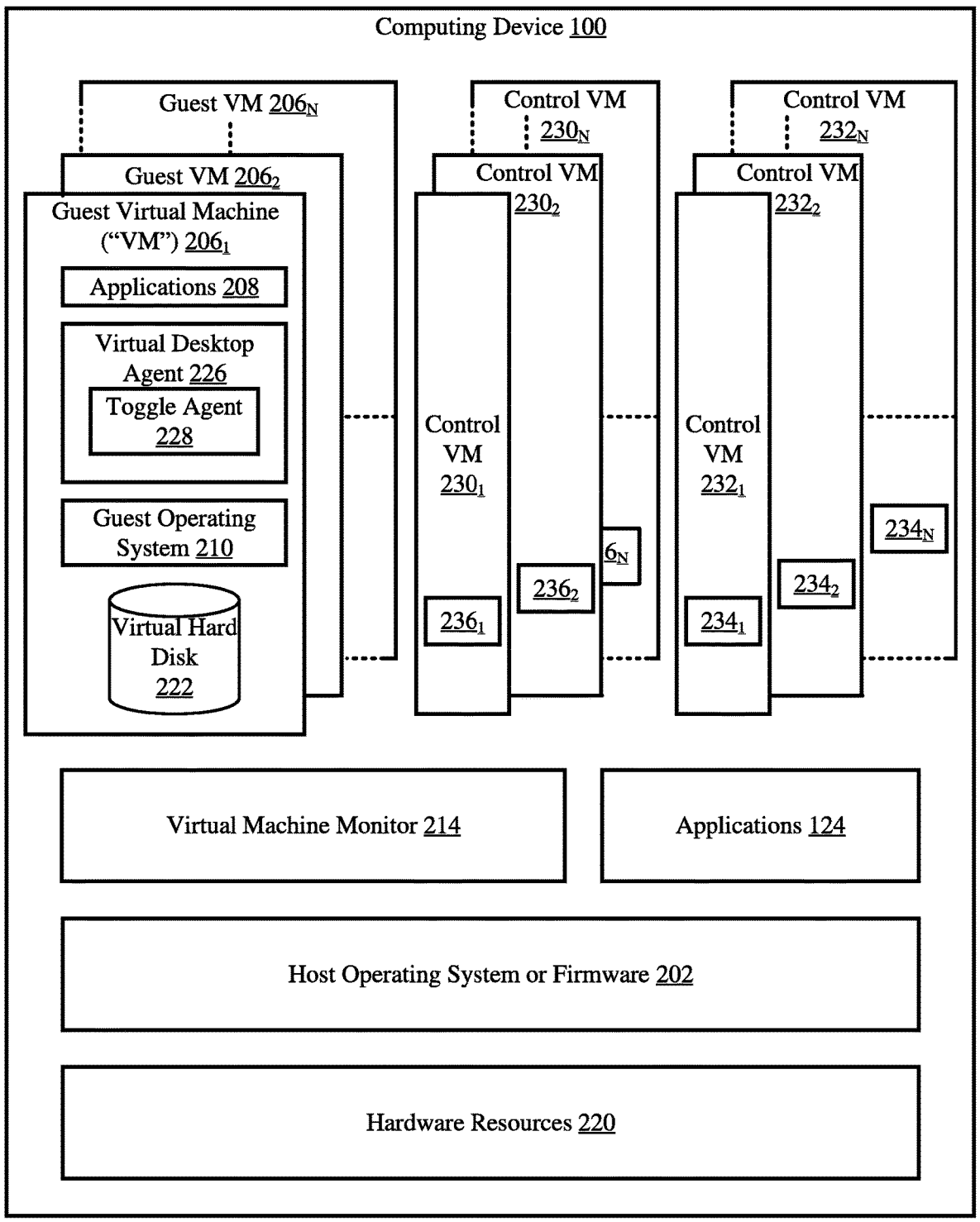
FIG. 2 is an illustration of an exemplary software architecture for the computing device of claim 1.

Referring now to FIG. 2, there is provided an illustration of the basic concepts of virtualization environment hosted by the computing device 100. As shown in FIG. 2, the computing device 100 runs a general purpose host OS or firmware 202 that manages access of one or more applications 124 to hardware resources 220. The hardware resources 220 include, but are not limited to, the hardware device 102-156 shown in FIG. 1.

A VMM 214 (or hypervisor) runs on the host computing device 100 and emulates the hardware of a physical system. The host computing device runs the VMM 214 in order to enable the concurrent execution of additional OS instances. From the perspective of the host OS or firmware 202, the VMM 214 is an application. The VMM 214 is generally a piece of software that creates VMs $206_1, 206_2, \ldots, 206_N, 230_1, 230_2, \ldots, 230_N, 232_1, 232_2, \ldots, 232_N$ and manages the operation of the virtualized environment on top of the physical host computing device 100. In this regard, the VMM 214 coordinates instructions to the CPU 106. The VMM 214 validates all the guest-issued CPU instructions and manages any executed code that required additional privileges. The additional OS instances run on the guest VMs $206_1, 206_2, \ldots, 206_N$ and control VMs $230_1, 230_2, \ldots, 230_N, 232_1, 232_2, \ldots, 232_N$.

Each guest VM is a software computer that runs a guest OS 210 (e.g., Windows 10) in an environment that is isolated from the host OS 202, from the other guest VMs and from the control VMs. The guest OS 210 hosts its own set of applications 208 and is installed on a virtual hard disk 222. The virtual hard disk 222 is implemented as a file that is stored on a file system accessible to the host computing device 100. From the perspective of the guest OS 210, the virtual hard disk 222 cannot be distinguished from a physical storage medium (e.g., memory 112 of FIG. 1). The virtual hard disk 222 stores a system image containing the complete content and structure of a physical hard disk. Multiple virtual hard disks containing disk images can be attached to the VM. The host computing device 100 controls access of the VM to the available hardware resources, such as a physical memory 112 of FIG. 1.

As noted above, the present solution provides a means to hand off the control of the guest domains $206_1, 206_2, \ldots, 206_N$ from old control domains $230_1, 230_2, \ldots, 230_N$ to new updated control domains $232_1, 232_2, \ldots, 232_N$ with minimal interruption of the guest domains $206_1, 206_2, \ldots, 206_N$ (e.g., without interrupting the guest domains longer than it would have taken by the conventional solutions which use live migration of the guest domains to another spare host). The transfer of such guest domain control is achieved in accordance with a Control Domain Backend Replacement ("CDBR") process and/or a Control Domain Migration ("CDM") process.

The CDBR process involves creating and installing new parallel control VMs $232_1, 232_2, \ldots, 232_N$ containing updated virtualization software $234_1, 234_2, \ldots, 234_N$. The new (or upgraded) control VMs $232_1, 232_2, \ldots, 232_N$ shadow the old control VMs $230_1, 230_2, \ldots, 230_N$ containing the old virtualization software $236_1, 236_2, \ldots, 236_N$ and take over communications with the guest VMs $206_1$, $206_2$, . . . , $206_N$ without the guest VMs $206_1$, $206_2$, . . . , $206_N$ noticing, in a backwards-compatible manner. In this case, no virtual migration drivers (e.g., Para-Virtualized ("PV") drivers) are installed in the guest VMs $206_1$, $206_2$, . . . , $206_N$.

The CDM process involves creating and installing new parallel control VMs $232_1$, $232_2$, . . . , $232_N$ containing the updated virtualization software $234_1$, $234_2$, . . . , $234_N$. The new (or upgraded) control VMs $232_1$, $232_2$, . . . , $232_N$ take over communications with the guest VMs $206_1$, $206_2$, . . . , $206_N$ using the existing live-migration capabilities of the guest VMs $206_1$, $206_2$, . . . , $206_N$ running on the virtualization host device 100. In this case, virtual migration drivers (e.g., PV drivers) are installed in the guest VMs $206_1$, $206_2$, . . . , $206_N$ in order to provide live-migration capabilities for the guest VMs $206_1$, $206_2$, . . . , $206_N$. Virtual migration drivers and PV drivers are well known in the art, and therefore will not be described in detail herein. Still, it should be understood that these drivers are generally configured to provide improved network and disk throughput to run the fully virtualized guest VMs $206_1$, $206_2$, . . . , $206_N$. In this regard, these drivers implement the following functionality: disk and network driver; interrupt and timer; emulated mother board and legacy boot; and privileged instructions and page tables. The CDM process can be used with the CDBR process to handle optimally guest domains in each of the cases with and without virtual migration drivers installed.

The present solution is not limited to the software architecture shown in FIG. 2. For example, in some scenarios, the host OS 202 and applications 124 reside within one or more control VMs, such as control VMs $230_1$, $230_2$, . . . , $230_N$. In some scenarios, the virtualization software is updated. For example, the virtualization software update applies to the control VMs and software contained therein. Accordingly, the host OS 202 and applications 124 would be updated. Software which is external to the control VMs would not be updated. The present solution is not limited to the particulars of this example.

Figure 3:
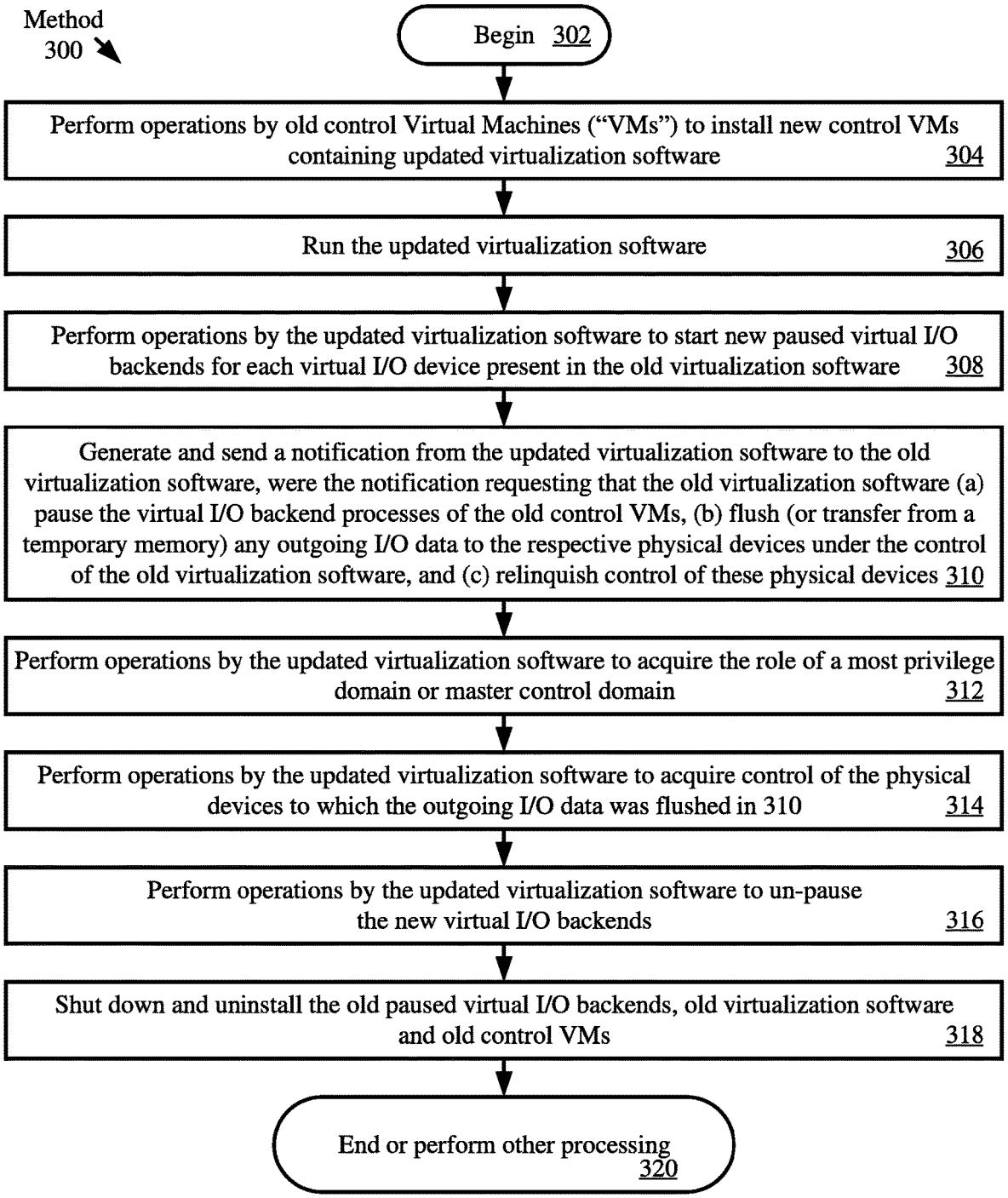
FIG. 3 is a flow diagram of an exemplary Control Domain Backend Replacement ("CDBR") process.

Referring now to FIG. 3, there is provided a flow diagram of an exemplary CDBR process 300. The CDBR process 300 begins with step 302 and continues with step 304 where old control VMs (e.g., control VMs $230_1$, $230_2$, . . . , $230_N$ of FIG. 2) perform operations to install new (or upgraded) control VMs (e.g., control VMs $232_1$, $232_2$, . . . , $232_N$ of FIG. 2) containing updated virtualization software (e.g., virtualization software $234_1$, $234_2$, . . . , $234_N$ of FIG. 2). Next in 306, the updated virtualization software runs. The updated virtualization software starts new paused virtual Input/Output ("I/O") backends for each virtual I/O device present in the old virtualization software (e.g., virtualization software $236_1$, $236_2$, . . . , $236_N$ of FIG. 2) that is providing the virtual network and storage I/O to the guest VMs.

Virtual I/O backends are well known in the art, and therefore will not be described in detail herein. However, it should be noted that the virtual I/O backends include locations where virtual I/O resources are stored. The virtual I/O resources can include, but are not limited to, virtual hard disks (e.g., virtual hard disk 222 of FIG. 2), virtual disk slices, virtual files, or virtual volumes. For example, a virtual disk contains two components: the virtual disk itself as it appears in a domain; and the virtual disk backend comprising the location where data of a virtual disk is stored and where virtual I/O ends up. The new virtual I/O backends use the same virtual interrupt request channel identifiers ("IDs") and point to the same memory buffers in the guest VMs, so that from the point of view of the guest VMs the virtual I/O backend configuration is unchanged.

In 310, the updated virtualization software (e.g., virtualization software $234_1$, $234_2$, . . . , $234_N$ of FIG. 2) generates a notification and sends the same to the old virtualization software (e.g., virtualization software $236_1$, $236_2$, . . . , $236_N$ of FIG. 2). The notification requests that the old virtualization software (a) pause the virtual I/O backend processes of the old control VMs, (b) flush (or transfer from a temporary storage area) any outgoing I/O data to the respective physical devices under the control of the old virtualization software, and (c) relinquish (or give up) control of these physical devices. Thereafter in 312, the updated virtualization software acquires the role of a most privileged domain or master control domain (e.g., Dom0).

In this role, the updated virtualization software (e.g., virtualization software $234_1$, $234_2$, . . . , $234_N$ of FIG. 2) performs operations in 314 and 316 to: acquire control of the physical devices to which the outgoing I/O data was flushed in 310; un-pause the new paused virtual I/O backends. Since the new un-paused virtual I/O backends are using the same virtual interrupt request channel IDs and are pointing to the same memory buffer contents as the old paused virtual I/O backends, the guest VMs do not notice that a new updated virtualization software is now running. Subsequently, the following items are shut down and uninstalled: the old paused virtual I/O backends; the old virtualization software; and the old control VMs.

Figure 4:
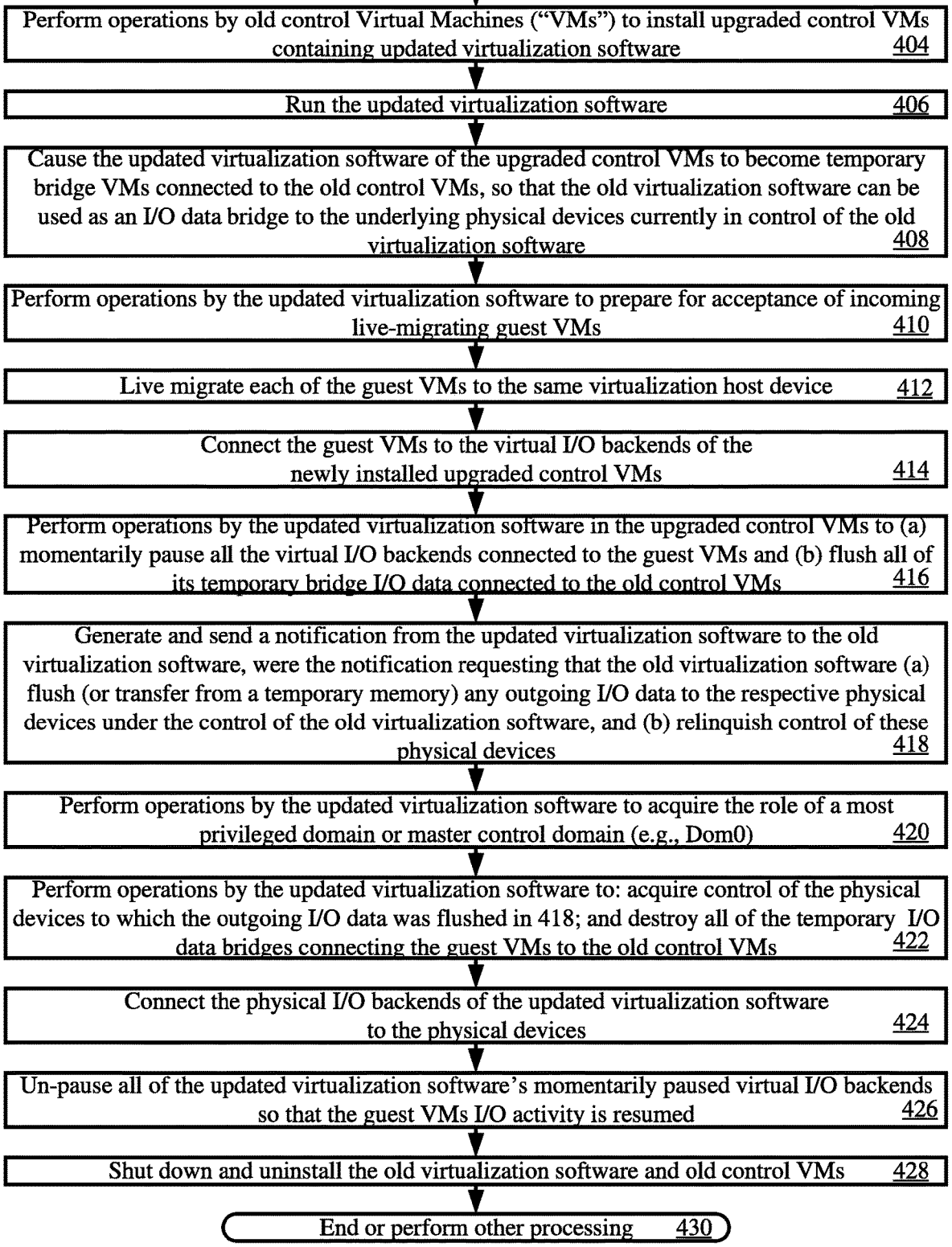
FIG. 4 is a flow diagram of an exemplary Control Domain Migration ("CDM") process.

Referring now to FIG. 4, there is provided a flow diagram of an exemplary CDM process 400. The CDM process 400 begins with step 402 and continues with step 404 where old control VMs (e.g., control VMs $230_1$, $230_2$, . . . , $230_N$ of FIG. 2) perform operations to install upgraded control VMs (e.g., control VMs $232_1$, $232_2$, . . . , $232_N$ of FIG. 2) containing updated virtualization software (e.g., virtualization software $234_1$, $234_2$, . . . , $234_N$ of FIG. 2). Next in 406, the updated virtualization software runs.

Thereafter in 408, the updated virtualization software of the upgraded control VMs becomes temporary bridge VMs connecting the guest VMs to the old control VMs. At this time, the upgraded control VMs do not have access to the physical hardware. Accordingly, the old virtualization software (e.g., virtualization software $236_1$, $236_2$, . . . , $236_N$ of FIG. 2) and the upgraded virtualization software are collectively used as an I/O data bridge to the underlying physical devices currently in control of the old virtualization software. As such, the guest VMs have working live-migration backends in both the old and upgraded control VMs pointing to the same virtual I/O devices during the subsequent live migration.

Upon completing 408, the updated virtualization software performs operations in 410 to prepare for acceptance of incoming live-migrating guest VMs. The live migration of guest VMs occurs in 412 (e.g., guest VMs $206_1$, $206_2$, . . . , $206_N$ of FIG. 2). The guest VMs are then connected to the virtual I/O backends of the newly installed upgraded control VMs, as shown by 414.

Upon completing 414, 416 is performed where the updated virtualization software in the upgraded control VMs (a) momentarily pause all the virtual I/O backends connected to the guest VMs and (b) flush all of its temporary bridge I/O data connected to the old control VMs. In 418, the updated virtualization software (e.g., virtualization software $234_1$, $234_2$, . . . , $234_N$ of FIG. 2) generates a notification and sends the same to the old virtualization software (e.g., virtualization software $236_1$, $236_2$, . . . , $236_N$ of FIG. 2). The notification requests that the old virtualization software (a)

flush (or transfer from a temporary storage area) any outgoing I/O data to the respective physical devices under the control of the old virtualization software, and (b) relinquish (or give up) control of these physical devices. Thereafter in 420, the updated virtualization software acquires the role of a most privileged domain or master control domain (e.g., Dom0).

In this role, the updated virtualization software (e.g., virtualization software $234_1$, $234_2$, ..., $234_N$ of FIG. 2) performs operations in 422 to: acquire control of the physical devices to which the outgoing I/O data was flushed in 418; and destroy all of its temporary I/O data bridges connecting the guest VMS to the old control VMs. At this point, the old control VMs have no more backends serving any virtual I/O to any other VM in the virtualization host device. In effect, the I/O data bridge provided by the old and upgraded virtualization software no longer exists since the upgraded virtualization software now has direct control of the physical devices.

In 424, the physical I/O backends of the updated virtualization software are connected to the physical devices. All of the updated virtualization software's momentarily paused virtual I/O backends are un-paused in 426 so that the guest VMs I/O activity is resumed. Finally in 428, the old virtualization software and old control VMs are shut down and uninstalled. Subsequently, 430 is performed where method 400 ends or other processing is performed.

Figure 5:
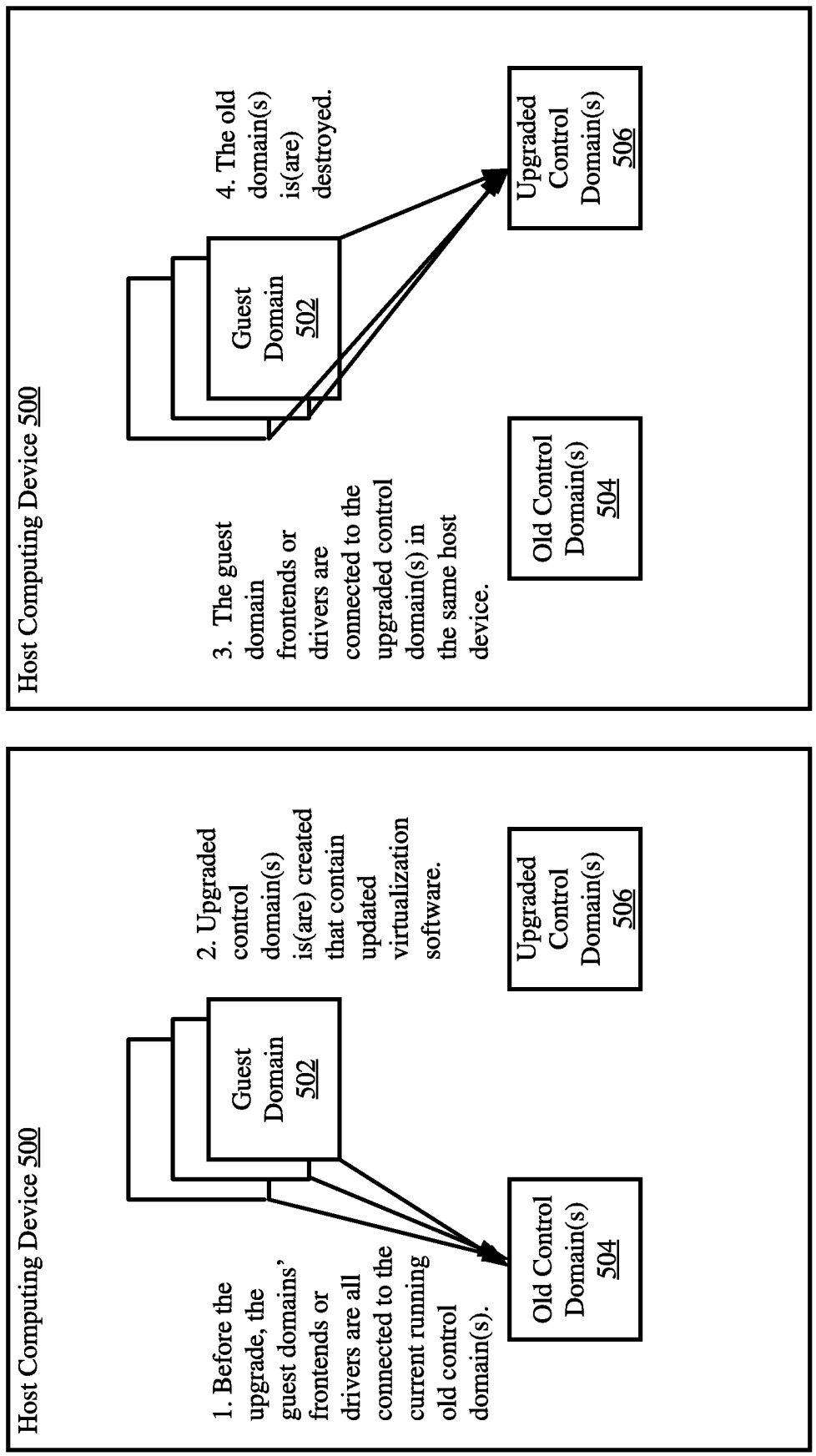
FIG. 5 is an illustration that summarizes the functionality of the present solution for the same host.

Referring now to FIG. 5, there is provided an illustration that summarizes the functionality of the present solution for the same host device. As shown in FIG. 5, there are four (4) high level functions performed by the computing device (e.g., computing device 100 of FIG. 1) for purposes of implementing the present solution. These four (4) high level functions include: connecting all of the guest domains' 502 frontends or drivers to the current running old control domain(s) 504 before the upgrade of the virtualization software; creating upgraded control domain(s) 506 that contain upgraded virtualization software which are to replace the old control domain(s) 504 in the same host computing device 500; connecting the guest domain 502 frontends or drivers to the upgraded control domain(s) 506 in the same host computing device 500; and destroy the old control domain(s) 504.

As evidenced by the above discussion, the present solution works by using the clean architectural domain separation of VMs between the control domains and guest domains provided by the VMM. The present solution can work in any virtualization architecture where it is possible to separate, as individual entities, control VMs from guest VMs. In some scenarios, the present solution is used in relation to a Citrix XenServer hypervisor. In the Citrix XenServer hypervisor, there is currently a single distinct control domain, with well-defined borders, called Dom0. The Dom0 is a control VM that needs to be updated in accordance with the present solution. As an alternative example, in a Kernel-based VM ("KVM") hypervisor, the control domain entity is not very distinct, but it might be considered as all the KVM processes providing the virtual I/O backends. The kernel in the KVM host device is relatively difficult to update without rebooting the host, but it is possible to change it to some extent without rebooting if modern hotfix technologies such as Ksplice are used. VMWare and HyperV hypervisors also do not have a distinctive architectural concept of a control domain as in the Citrix XenServer hypervisor, but an adaptation of the control domain concept as done above for the KVM hypervisor is feasible here.

Conventional Live-Patching solutions can be used to update a control domain kernel to some extent. However, such conventional Live-Patching solutions are limited in scope of what they can change in the kernel. It is useful when there is a small change in some kernel function (usually to fix security bugs), but becomes tricky to develop when there are changes in data structures (because they can potentially have a knock-on effect on many other functions). The present solution can upgrade all the kernels in the control domains without this limitation in scope.

Unlike the conventional kernel Live-Patching solutions, the present solution allows a user to start over the control domain(s) with a completely new kernel and its arbitrary data structures without the complexity of mapping the old kernel state into the new kernel—or even a completely different kernel (for instance a control domain running a Berkley Software Distribution ("BSD") OS or a Windows kernel instead of a Linux kernel. Upgrading all of the control domains (including Dom0 used to control other domains and physical I/O devices) in a virtualization host device without rebooting the host device (including both the kernels and user space tools inside these domains) is a unique capability of the present solution which is not known to be present in other virtualization software solutions.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method, comprising:
executing a first virtual machine and a second virtual machine on a host computing device, wherein:
the first virtual machine manages guest virtual machines,
the second virtual machine operates as a temporary bridge virtual machine including temporary bridge I/O data and is connected to the first virtual machine, and
the first virtual machine operates as a I/O data bridge to a physical resource, wherein the first virtual machine is configured to enable the guest virtual machines to communicate with a first I/O process to access a virtual resource;
live migrating the guest virtual machines connected to the first I/O process of the first virtual machine to the second virtual machine on the host computing device, wherein live migrating the guest virtual machines connected to the first I/O process of the first virtual machine to the second virtual machine on the host computing device comprises:
    connecting the guest virtual machines to a second I/O process of the second virtual machine, and
    live migrating the guest virtual machines to the second I/O process of the second virtual machine;
after live migrating the guest virtual machines:
    pausing the second I/O process of the second virtual machine, and
    flushing the temporary bridge I/O data of the second virtual machine to the first virtual machine;
subsequent to pausing the second I/O process of the second virtual machine and flushing the temporary bridge I/O data of the second virtual machine to the first virtual machine, sending a notification from the second virtual machine to the first virtual machine that prompts the first virtual machine to:
    transfer, to the physical resource, outgoing data communicated to the first I/O process, and
    relinquish control of the physical resource;
based on the notification:
    transferring, by the first virtual machine and to the physical resource, the outgoing data communicated to the first I/O process, and
    relinquishing, by the first virtual machine, control of the physical resource;
after the first virtual machine has relinquished control of the physical resource:
    acquiring, by the second virtual machine, control of the physical resource, and
    destroying temporary I/O data bridges connecting the guest virtual machines to the first virtual machine; and
after the second virtual machine has acquired control of the physical resource, enabling the guest virtual machines to communicate with the second I/O process of the second virtual machine to access the virtual resource.

2. The method of claim 1, wherein the first I/O process and the second I/O process both use a same set of virtual interrupt request channel identifiers.

3. The method of claim 1, wherein the first I/O process and the second I/O process both point to a same set of memory buffers in the guest virtual machines.

4. The method of claim 1, wherein:
the notification further prompts the first virtual machine to pause the first I/O process.

5. The method of claim 1, further comprising:
prior to the second virtual machine acquiring control of the physical resource, acquiring, by the second virtual machine, a role of most privileged domain.

6. The method of claim 1, further comprising:
acquire, by the second virtual machine, control of the physical resource while the second I/O process is paused.

7. The method of claim 6, wherein enabling the guest virtual machines to communicate with the second I/O process comprises unpausing the second I/O process.

8. The method of claim 7, further comprising:
pausing the first I/O process of the first virtual machine, wherein the second I/O process is paused prior to pausing the first I/O process.

9. The method of claim 1, wherein the guest virtual machines are implemented on the host computing device.

10. A host computing device, comprising:
at least one processor; and
at least one computer-readable medium encoded with instructions which, when executed by the at least one processor, cause the host computing device to:
    execute a first virtual machine and a second virtual machine on the host computing device, wherein:
        the first virtual machine manages guest virtual machines,
        the second virtual machine operates as a temporary bridge virtual machine including temporary bridge I/O data and is connected to the first virtual machine, and
        the first virtual machine operates as a I/O data bridge to a physical resource, wherein the first virtual machine is configured to enable the guest virtual machines to communicate with a first I/O process to access a virtual resource;
    live migrate the guest virtual machines connected to the first I/O process of the first virtual machine to the second virtual machine on the host computing device,
    wherein live migrating the guest virtual machines connected to the first I/O process of the first virtual machine to the second virtual machine on the host computing device comprises:
        connecting the guest virtual machines to a second I/O process of the second virtual machine, and
        live migrating the guest virtual machines to the second I/O process of the second virtual machine;
    after live migrating the guest virtual machines:
        pausing the second I/O process of the second virtual machine, and
        flushing the temporary bridge I/O data of the second virtual machine to the first virtual machine;
    subsequent to pausing the second I/O process of the second virtual machine and flushing the temporary bridge I/O data of the second virtual machine to the first virtual machine, send a notification from the second virtual machine to the first virtual machine that prompts the first virtual machine to:
        transfer, to the physical resource, outgoing data communicated to the first I/O process, and
        relinquish control of the physical resource;
    based on the notification:
        transferring, by the first virtual machine and to the physical resource, the outgoing data communicated to the first I/O process, and
        relinquishing, by the first virtual machine, control of the physical resource;
    after the first virtual machine has relinquished control of the physical resource:
        acquire, by the second virtual machine, control of the physical resource, and
        destroy temporary I/O data bridges connecting the guest virtual machines to the first virtual machine; and
    after the second virtual machine has acquired control of the physical resource, enable the guest virtual machines to communicate with the second I/O process of the second virtual machine to access the virtual resource.

11. The host computing device of claim 10, wherein the at least one computer-readable medium is further encoded with additional instructions which, when executed by the at least one processor, further cause the host computing device to configure the first I/O process and the second I/O process to both use a same set of virtual interrupt request channel identifiers.

12. The host computing device of claim 10, wherein the at least one computer-readable medium is further encoded with additional instructions which, when executed by the at least one processor, further cause the host computing device to configure the first I/O process and the second I/O process to both point to a same set of memory buffers in the guest virtual machines.

13. The host computing device of claim 10, wherein the notification further prompts the first virtual machine to pause the first I/O process.

14. The host computing device of claim 10, wherein the at least one computer-readable medium is further encoded with additional instructions which, when executed by the at least one processor, further cause the host computing device to:
  acquire, by the second virtual machine and prior to the second virtual machine acquiring control of the physical resource, a role of most privileged domain.

15. The host computing device of claim 10, wherein the at least one computer-readable medium is further encoded with additional instructions which, when executed by the at least one processor, further cause the host computing device to:
  acquire, by the second virtual machine, control of the physical resource while the second I/O process is paused.

16. The host computing device of claim 15, wherein the at least one computer-readable medium is further encoded with additional instructions which, when executed by the at least one processor, further cause the host computing device to:
  enable the guest virtual machines to communicate with the second I/O process at least in part by unpausing the second I/O process.

17. The host computing device of claim 16, wherein the at least one computer-readable medium is further encoded with additional instructions which, when executed by the at least one processor, further cause the host computing device to:
  pause the first I/O process of the first virtual machine, wherein the second I/O process is paused prior to pausing the first I/O process.

* * * * *